United States Patent [19]

Lloyd et al.

[11] 4,072,064
[45] Feb. 7, 1978

[54] ANTI-BACKLASH GEAR ASSEMBLY

[75] Inventors: Wayne B. Lloyd, Baltimore; John H. Staehlin, Lutherville, both of Md.

[73] Assignee: Westinghouse Electric Corporation, Pittsburgh, Pa.

[21] Appl. No.: 765,031

[22] Filed: Feb. 2, 1977

[51] Int. Cl.² ............................................. F16H 55/18
[52] U.S. Cl. ............................................. 74/409; 74/440
[58] Field of Search ........................... 74/440, 409

[56] References Cited
U.S. PATENT DOCUMENTS 2,081,644   5/1937   Smythe .................................. 74/440

Primary Examiner—Leonard H. Gerin
Attorney, Agent, or Firm—D. F. Straitiff

[57] ABSTRACT

An anti-backlash gear assembly including an hydraulic piston that automatically maintains clearance-filling positioning of two relatively circumferentially adjustable axial parts of a split gear by receipt of hydraulic fluid from a local accumulator via a fluid-retaining check valve means.

4 Claims, 3 Drawing Figures

ANTI-BACKLASH GEAR ASSEMBLY

BACKGROUND OF THE INVENTION

1. Field of the Invention

Anti-backlash gear assemblies or devices.

2. Description of the Prior Art

A preliminary search directed to the novel features of the present invention uncovered the following prior art U.S. Pat. Nos.: 2,081,644 to Smythe; 2,640,428 to Houghton; 2,896,466 to Wiseman; 2,918,826 to Miller; 3,020,775 to Musser; 3,166,952 to Lang; 3,359,819 to Veillette et al. ; and 3,365,973 to Henden.

Among these patents, several are directed to arrangements where the two parts of a split gear are actuated for anti-backlash collective tooth expansion by action of a spring means that is constantly effective; the Henden and Veillette et al patents. Such constant effectiveness of the spring means affords automatic effectuation of the anti-backlash action, but the spring action causes the teeth of the split gear to exert a constant bias force against the teeth of the gear or pinion with which the split gear is mated. Under some circumstances, such constant anti-backlash force can lead to undue wear of the gear teeth.

One patent, the Miller patent, employs a mechanical adjusting means for a split-gear type of anti-backlash control. While this tends to eliminate the constant bias force of the spring actuation type above, it does require periodic manual adjustment, which may be inconvenient if not impossible under some operational circumstances.

Several patents, the Smythe, Houghton, and Wiseman patents, employ hydraulic pressure means for spreading the teeth of the split gear into clearance-free contact with the teeth of the mating gear. In both arrangements the split-gear tooth-spreading-force is generated and maintained during anti-backlash action by the hydraulic pressure from an external source supplied to a piston means. This tends to create the same wear-inducing mating-tooth-engaging forces created by the spring bias force discussed above in connection with the Henden and Veillette et al. patent disclosures.

The Miller and Lang patents disclose anti-backlash gear drive constructions of relatively complex nature that are even more impertinent to the features of the present invention than those of the preceding patents discussed above.

SUMMARY OF THE INVENTION

The present invention, in providing for takeup of clearance between meshing gear teeth automatically by transfer of hydraulic fluid from a local accumulator to an hydraulic piston means, assures that such clearance takeup is obtained in a convenient and simplified manner that does not rely on perpetual availability of an hydraulic pump supply locally at the gear use site. By virtue of entrapment of hydraulic fluid behind the clearance-gathering piston means by a lightly biased check valve means, the clearance-gathered positions of the adjustable gear means can be maintained yield-free with respect to reaction from driving force delivered to the complementary meshing gear, yet be relaxed with respect to any significant exertion of force between mating gear teeth during idling operation of the gears. Accordingly, the hydraulic pressure of the fluid stored in the accumulator can be relatively low, with consequent relaxation of strength requirements as to its construction.

In operation of the present invention, as any slight clearance develops, due to wear, for example, between the mating gear teeth, such clearance affords freedom for travel of the adjusting piston means during relaxation of gear drive effort, such as during idling or intervals between direction reversals, to effect adjustment of the adjustable gear means to eliminate such clearance. Such piston means travel is automatically effected by flow of hydraulic fluid from the local accumulator via the fluid-retaining check valve means. Only a slight bias force is needed to effect such clearance-takeup flow of hydraulic fluid to the takeup piston means during such gear-drive-force relaxation periods; which bias force may be furnished by spring means affiliated with the adjustable gear means directly and/or indirectly via the accumulator by imposition of a necessary degree of pressurization of the hydraulic fluid therein. During gear drive operation, the fluid-retaining check valve means retains a solid column of hydraulic fluid against the piston means to prevent collapse of its clearance takeup position under influence of driving force reaction.

DETAILED DESCRIPTION OF THE INVENTION

Figure 1:
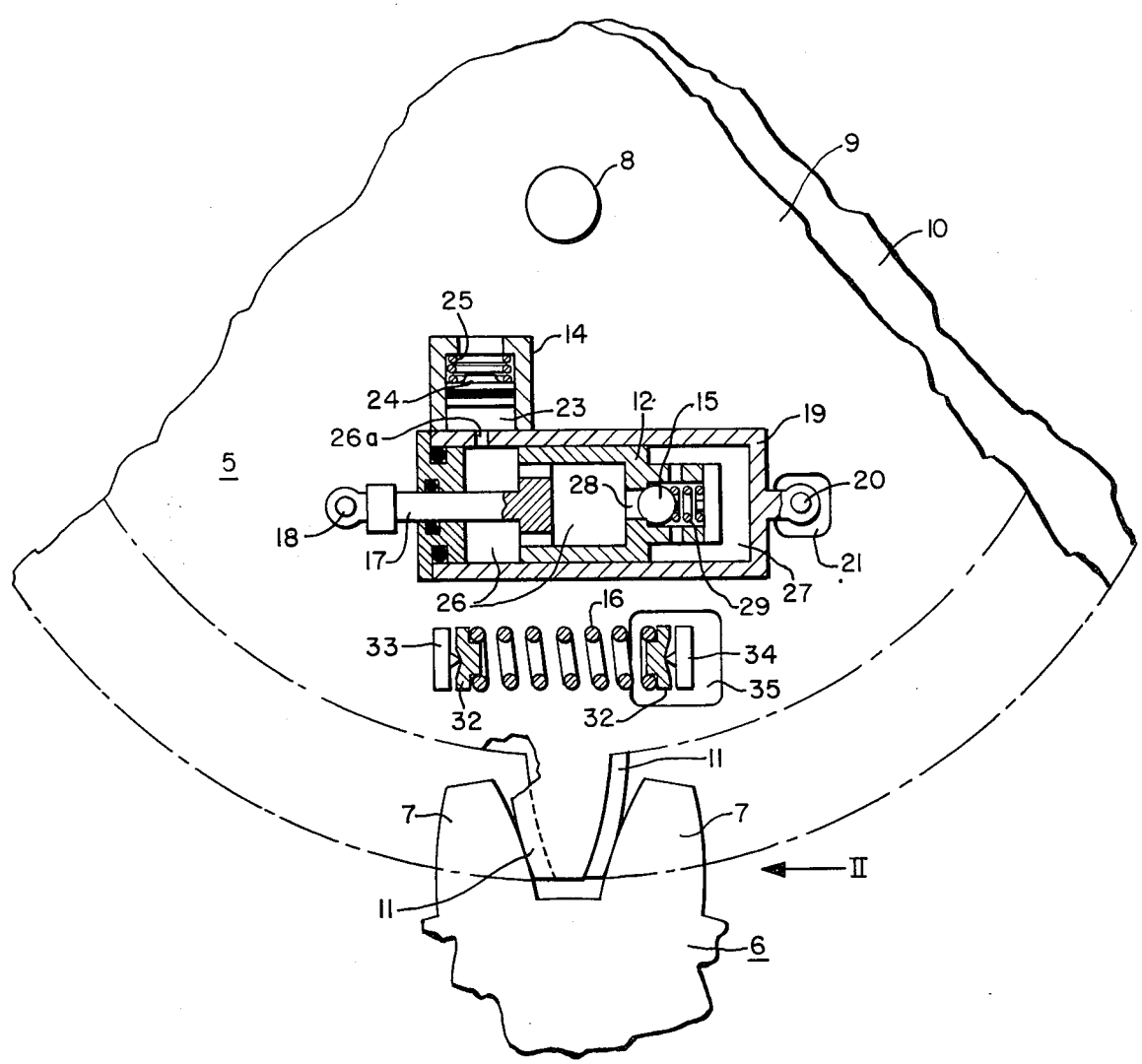
FIG. 1 is a schematic showing, partly in outline and partly in section, of one illustrative embodiment of the invention.

Referring to FIG. 1, the illustrative embodiment of the invention as shown therein comprises a split gear 5 as the adjustable gear means for clearance compensation. The split gear 5 is intended for driving interengagement with a second gear or pinion 6, having the usual gear teeth 7 on its outer periphery.

Figure 2:
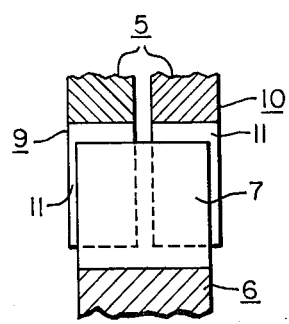
FIG. 2 is a fragmented view of a detail of the embodiment shown in FIG. 1.

The split gear 5 is secured for rotation on a shaft 8 and includes two identical axially separated side-by-side sections 9 and 10, one overlying the other as shown in FIG. 1, and immediately adjacent to one another as shown in FIG. 2. Each gear section 9, 10 has gear teeth 11 for engagement with the teeth 7 of gear 6 to effect driving interengagement between the two gears 5 and 6. The teeth 11 of the two gear sections 9 and 10 of the split gear 5 are all the same and are of slightly lesser circumferential dimension than the spacing between the teeth 7 of gear 6, as can be seen in FIG. 1. By circumferential adjustment of the position of the one split gear section 9 relative to section 10, the teeth of the split gear collectively are made to span the intertooth space of the gear 6 to eliminate mating tooth clearance and prevent backlash upon reversal in gear drive direction. As the gear teeth wear and tend to develop further circumferential tooth clearance, circumferential readjustment of the two split gear sections 9 and 10 one relative to the other can be made to eliminate such clearance and prevent backlash.

In accord with the present invention such circumferential adjustment (adjustment in the relative circumferential positions of the two split gear sections 9 and 10) is accomplished automatically by an hydraulic piston 12 supplied with hydraulic fluid from an adjacent accumulator 14 via a fluid-retaining check valve 15 each time driving force between the teeth of the two gears 5 and 6 is relaxed. A light bias spring 16 develops the necessary circumferential spreading force between the two split gear sections that becomes effective upon such driving-force relaxation.

The piston 12 is operatively affiliated with the sections 9 and 10 of the split gear 5 by way of a piston rod 17 connected via a post 18 to section 9 and a cylindrical piston housing 19 connected via a post 20 to section 10. The pin or post 20 extends from the gear section 10 to the housing 19 via an opening 21 through gear section 9. Pin 20 has sufficient clearance within the opening 21 to permit the necessary circumferential relative movement between gear sections during clearance adjustment takeup. The accumulator 14 is shown directly mounted on the outside of cylindrical housing 19 near its piston rod end. The accumulator includes an hydraulic-fluid-filled chamber 23 at one side of a piston 24 that is biased by a helical compression spring 25 toward causing displacement of fluid from chamber 23. Chamber 23 is constantly open via a port 25 to a chamber 26 at a non-working side of the piston 12. Communication between the non-working-chamber 26 side of the piston 12 and its position-defining or working side at a chamber 27 occurs via a central port 28 opening through the piston and the check valve 15 which is lightly biased toward its closed position by a spring 29. The cylinder 19 extends generally in a circumferential direction on one face of the gear section 9. Entrapment of hydraulic fluid in chamber 27 by action of the check valve 15 maintains the relative circumferential positioning of the two gear sections 9 and 10 of the split gear 5 to hold the adjacent teeth 11 spread circumferentially to span the teeth 7 of the gear 6 to prevent backlash during gear direction reversals. It being appreciated that the length of the piston 12-cylinder 19 combination is a function of the amount of hydraulic fluid in chamber 27 and that such length in turn determines the circumferential positioning of the one split gear section relative to the other. It should be pointed out also that any significant pressurization of fluid in the chamber 27 results from reaction of engaging forces between the split gear teeth sections 11 and the teeth 7 of gear 6 and not from any significant pressurization of the hydraulic fluid by the bias spring 25 in the accumulator 14.

The helical compression spring 16 is connected to the split gear sections 9 and 10 in parallel with the piston and cylinder assembly 12 and 19. One end of the spring is operatively connected to the gear section 9 via a spring seat member 32 and a rigid post 33 projecting from the face of such section, while the opposite end of the spring 16 is connected to the gear section 10 via a similar spring seat member 32 and a post 34 attached to and projecting from the inner face of the gear section 10. Post 34 extends through an accommodating opening 35 in the gear section 9 with sufficient clearance to permit the clearance-adjusting movement of the one gear section relative to the other as previously described. It should be understood that the force of spring 16 acting on the gear sections in a manner tending to spread the adjacent teeth 11 of the two split gear sections in the circumferential direction, as aforedescribed, is relatively light and substantially only that needed for such spring to effectuate such spreading movement of the gear sections at times of driving force relaxation between the spread teeth 11 and the gear 6 teeth 7, which relaxation occurs at times of rotation direction changes.

It is conceivable that the spring 25 in the accumulator 14 might be made to impose a sufficient bias on the piston 24 in such accumulator that the hydraulic pressure in chambers 23, 26, and 27 would act on piston 12 and thereby gear sections 9 and 10 in the same manner as the spring 16 does, so that such spring 16 could be dispensed with.

Figure 3:
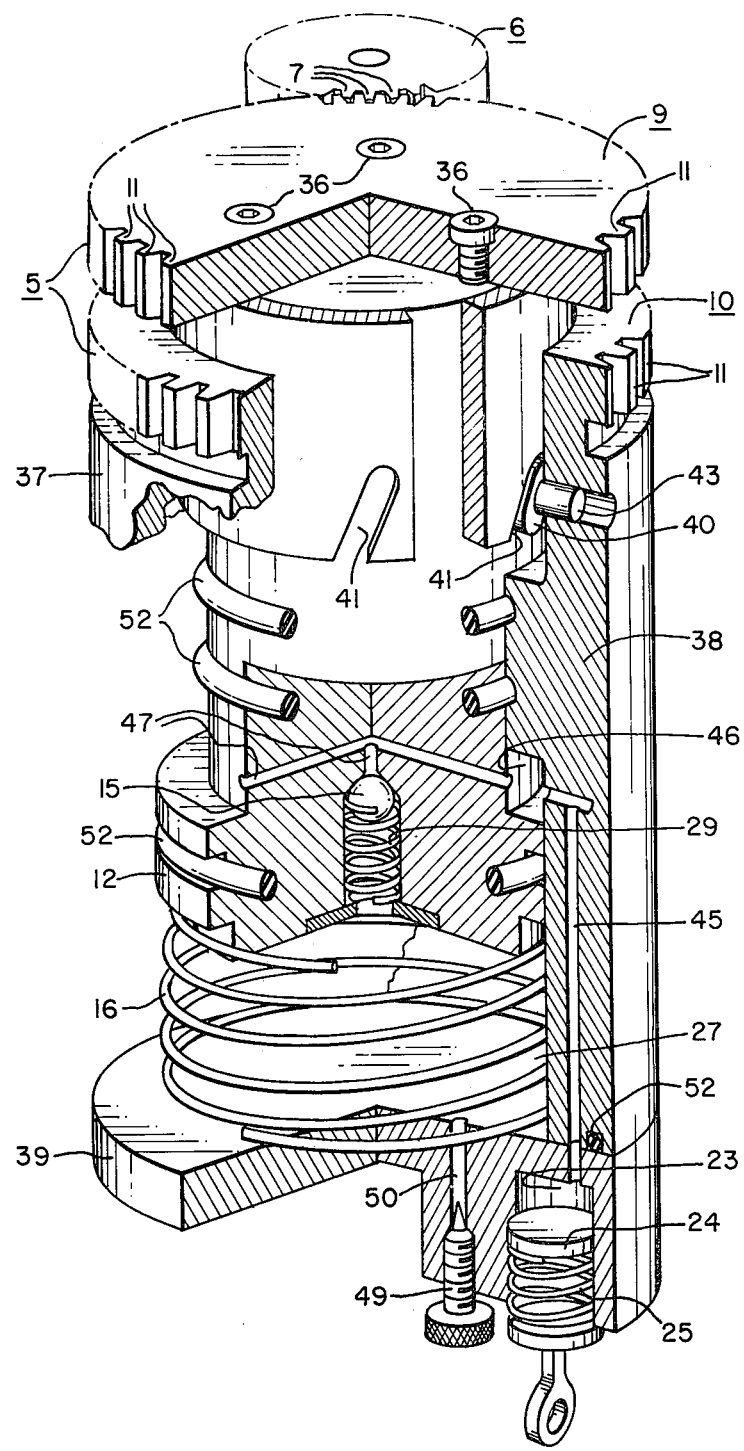
FIG. 3 is a three-dimensional view of an alternate embodiment of the invention.

In the illustrative embodiment shown in FIG. 3, the split gear sections are disposed at one end of the piston 12 in coaxial affiliation therewith. One of the gear sections, section 9, is attached to one end of piston 12 by such as machine screws 36, while the other split gear section 10 is formed in one end of a hollow cylindrical housing member 38. The piston 12 and a skirt 37 on the gear section 9 are in slidable fit with interior walls of such hollow cylindrical housing member 38 which is closed at an end defining the piston chamber 27 by an end wall member 39. Functionally similar parts of the embodiments of FIGS. 1 and 3 have been given the same reference numerals.

In the FIG. 3 embodiment the functionally similar parts having the same reference numerals as those of FIG. 1 operate generally the same manner as described in connection with the FIG. 1 embodiment. In FIG. 3, however, the clearance-takeup spring 16 is disposed in chamber 27 and interposed between the end wall member 39 and the clearance-position-holding piston 12 which is operatively coupled to the gear section 10 through the medium of a cam means 40 and tilted slots in the skirt 37. The cam means 40 is pivotally supported by the housing member 38 via a pin means 43 and slidably cooperates with the side walls of the sloping grooves 41 to transform axial motion of the piston 12 simultaneously into a rotary movement of such piston and the attached gear section 9 relative to the housing member 38 and gear section 10 to obtain clearance takeup positioning of the teeth 11 of adjacent gear sections 9 and 10 with respect to teeth of companion gear 6, as aforedescribed in connection with the FIG. 1 embodiment.

Hydraulic fluid from the accumulator chamber 23, which is formed in a part of the end wall member 39, reaches the piston chamber 27 via a passageway 45 in housing member 38, an annular chamber 46 encircling a portion of the piston 12 and passage means in such piston leading to an inlet to the check valve 15. To permit adjustment of the piston 12 initially to suit the required gear section positions, a needle valve 49 and bleed port 50 are affiliated with the piston chamber 27 that controls piston 12 position. O-ring seals 52 are provided at suitable locations to prevent escape of hydraulic fluid.

It will be appreciated that other means may be employed in the FIG. 3 embodiment for effecting rotary movement of the gear section 9 from axial movement of the piston 12. For example an arrangement, not shown, might be employed for effecting such movement without affecting the axial position of the one gear section relative to the other.

Having now described the invention, what is claimed as new and desired to be secured by Letters Patent is:

1. An anti-backlash gear assembly comprising,
  mating gears having interengaging teeth for effecting a driving relationship therebetween,
  geartooth clearance adjusting means for said mating gears, hydraulic piston means operatively connected to said geartooth clearance adjusting means, an accumulator storing hydraulic fluid for supply to said piston means, check valve means for retaining hydraulic fluid supplied to said piston means, and bias means for urging hydraulic fluid to flow from said accumulator to said piston means via said check valve means upon existence of any backlash-inducing clearance during relaxation of driving effort between said interengaging gear teeth.

2. The anti-backlash gear assembly of claim 1, wherein,
said bias means includes spring means disposed within said accumulator and other spring means disposed without said accumulator.

3. The anti-backlash gear assembly of claim 1, wherein,
said bias means is disposed exclusively within said accumulator.

4. The anti-backlash gear assembly of claim 1, wherein,
said geartooth clearance adjusting means is in the form of a split gear having side-by-side sections with teeth adjustable circumferentially, one section relative to the other.

* * * * *